United States Patent [19]
Fletcher et al.

[11] 3,915,482
[45] Oct. 28, 1975

[54] EXTERNALLY SUPPORTED INTERNALLY STABILIZED FLEXIBLE DUCT JOINT

[76] Inventors: James C. Fletcher, Administrator of the National Aeronautics and Space Administration, with respect to an invention of James R. Rollins, Woodlands Hills, Calif.

[22] Filed: June 27, 1974

[21] Appl. No.: 483,850

[52] U.S. Cl............................. 285/226; 285/265
[51] Int. Cl.² ........................................ F16L 21/00
[58] Field of Search .......... 285/265, 226, 227, 228, 285/229, 300, 301, 299

[56] References Cited
UNITED STATES PATENTS

| | | | |
|---|---|---|---|
| 2,604,339 | 7/1952 | Koysing et al. | 285/300 |
| 3,112,129 | 11/1963 | Willis et al. | 285/226 |
| 3,663,044 | 5/1972 | Contreros | 285/226 |

FOREIGN PATENTS OR APPLICATIONS

| | | | |
|---|---|---|---|
| 809,656 | 2/1959 | United Kingdom | 285/226 |

Primary Examiner—Dave W. Arola
Attorney, Agent, or Firm—Wayland H. Riggins; L. D. Wofford, Jr.; John R. Manning

[57] ABSTRACT

An externally supported internally stabilized flexible duct joint particularly suited for use in conducting the flow of fluid between a pair of tubular conduits, at least one of which is supported for motion relative to the other. The joint is characterized by a low-flow loss coefficient and includes a pair of coaxially related terminal sleeves adapted to be coupled with adjacently disposed conduits, and an elongated bellows extended between the terminal sleeves. The bellows is supported against thrust induced extension by linkage including a gimbal ring concentrically related to the mid-span of the bellows and a pair of terminal supports affixed to the terminal sleeves and journaled to the gimbal ring. A bellows stabilizing sleeve is disposed within the bellows for avoiding flow impingement and preventing lateral shifting while a support ring is mounted on the stabilizing sleeve and connected to the mid-span of the bellows for connecting the bellows with the stabilizing sleeve.

3 Claims, 5 Drawing Figures

EXTERNALLY SUPPORTED INTERNALLY STABILIZED FLEXIBLE DUCT JOINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention generally relates to flexible duct joints adapted to conduct a flow of pressurized fluid between a pair of mutually spaced conduits, and more particularly to an externally supported flexible duct joint, including a bellows, characterized by a relatively low flow loss coefficient and adapted to be employed in high-pressure systems and deflected with the bellows thereof achieving a uniform curvature, whereby bending stress and the effects of fatigue are reduced.

The prior art includes numerous flexible duct joints of the type, including tubular bellows, suited for use in uniting adjacent ends of angularly related ducts. Such joints must be flexible for accommodating changes in configuration, while being capable of withstanding relatively high operating pressures. As can readily be appreciated by those familiar with the design and fabrication of flexible duct joints, an initially curved bellows tends to experience lateral shifting, that is to say, a change in shape of its center line, when subjected to high internal pressures, in a manner not unlike that experienced by an axially loaded curved beam having its ends rigidly restrained. Hence, bellows employed in flexible duct joints subjected to both high operating pressures and large deflection angles frequently tend to experience lateral shift and an attendant change in bend radius. Of course, such bellows are subjected to a reduction in fatigue life, as a consequence of the thus induced increase in bending stress.

Heretofore, attempts have been made to overcome the aforementioned disadvantages by providing a plurality of coaxially aligned bellows assemblies for accommodating certain imposed angulation requirements. Alternatively, attempts have been made to employ bellows having higher inherent stiffness characteristics resulting from an increased mass. Unfortunately, such design practices generally have resulted in complex, massive, and economically expensive joints, often totally impractical for use in environments wherein reduction of weight and simplicity in design are of an utmost concern.

In instances where a low-pressure drop through the joint does not constitute a design parameter, a satisfactory solution to the problem of achieving lateral stability near the center span of a pressurized duct bellows joint has been achieved through a duct joint which includes a tubular flexible bellows provided with internal supporting structure through which lateral stabilization of the bellows is facilitated. However, as can readily be appreciated, in instances where low-pressure drop constitutes a significant design parameter, it often is impractical to provide internal structure for supporting the duct.

It is therefore the general purpose of the instant invention to provide an improved flexible duct joint characterized by a relatively low-flow loss coefficient and particularly suited for use in an environment wherein the joint is subjected to both relatively high internal pressures and large deflection angles.

OBJECTS AND SUMMARY OF THE INVENTION

It is therefore an object of the instant invention to provide a flexible duct joint which overcomes the aforementioned difficulties and disadvantages.

It is another object to provide an improved flexible duct joint including a flexible bellows and an external linkage for restraining pressure separating thrust of the bellows.

It is another object to provide an improved flexible duct joint including a flexible bellows, an external supporting linkage for supporting the bellows against pressure separating thrust, and a stabilizing sleeve for inhibiting fluid impingement.

It is another object to provide an improved, lightweight flexible duct joint, the mid-span of which is laterally stabilized by an internal supporting sleeve through which uniformity in the curvature of the bellows along the bend radius of the joint is achieved as the joint is subjected to both relatively high internal pressures and large deflection angles.

These and other objects and advantages are achieved through the use of a tubular bellows, and an external supporting linkage for the bellows, including a gimbal ring concentrically related to the bellows and terminal supports for pivotally coupling the distal ends of the flexible duct joint with the gimbal ring, and a stabilizing sleeve connected with the opposite ends of the duct joint, as will hereinafter become more readily apparent by reference to the following description and claims in light of the accompanying drawings.

DESCRIPTION OF THE PREFERRED EMBODIMENT

Figure 1:
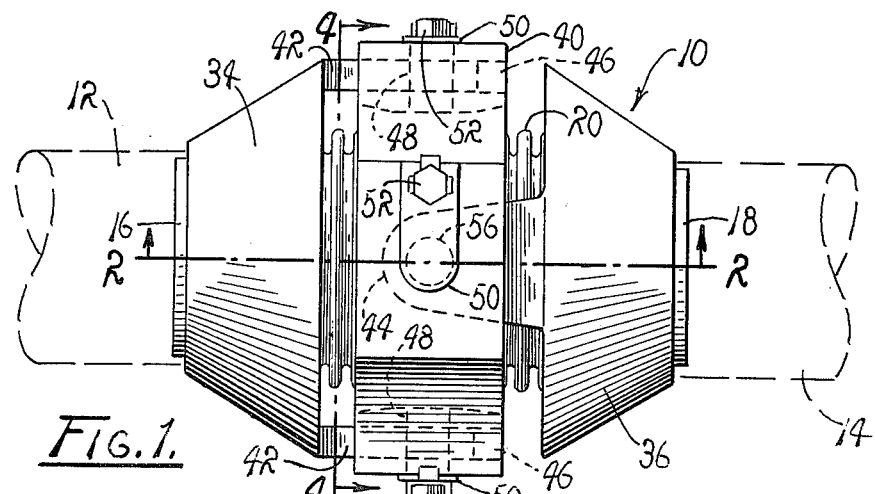
FIG. 1 is a top plan view of a flexible duct joint which embodies the principles of the instant invention.

Referring now with more specificity to the drawings, wherein like reference characters designate like or corresponding parts throughout the several views, there is shown in FIG. 1 an improved flexible duct joint, generally designated 10, which embodies the principles of the instant invention.

Figure 2:
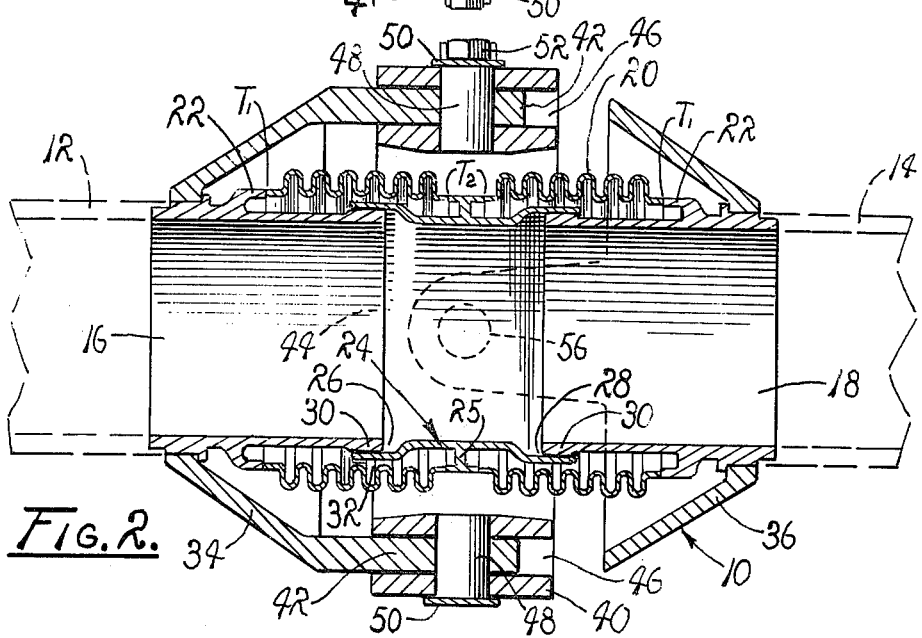
FIG. 2 is a cross-sectional view taken generally along line 2—2 of FIG. 1.
Figure 3:
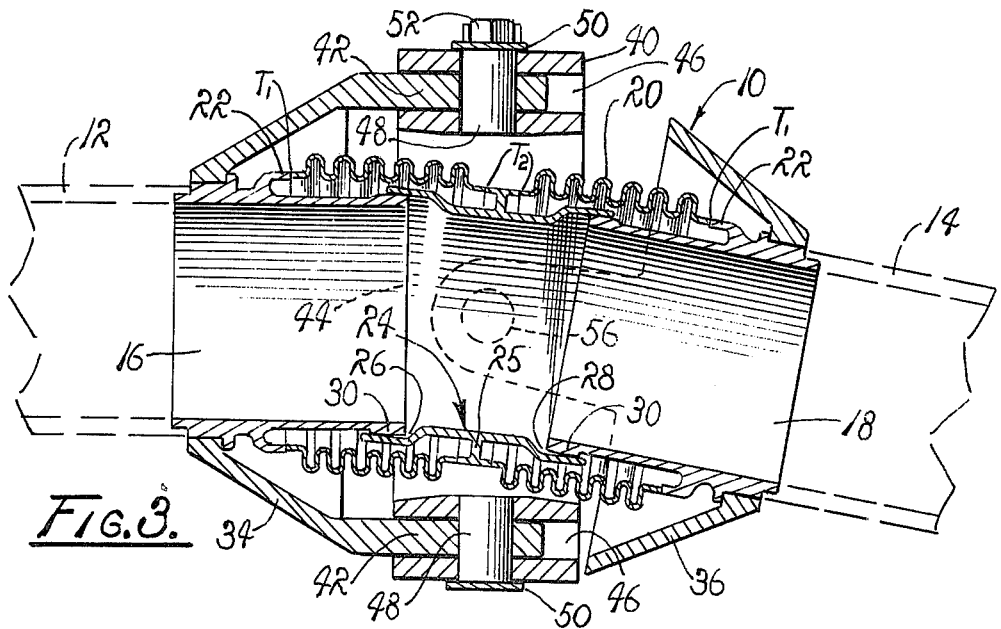
FIG. 3 is a cross-sectional view, similar to that of FIG. 2, illustrating the duct joint in a deflected configuration.
Figure 4:
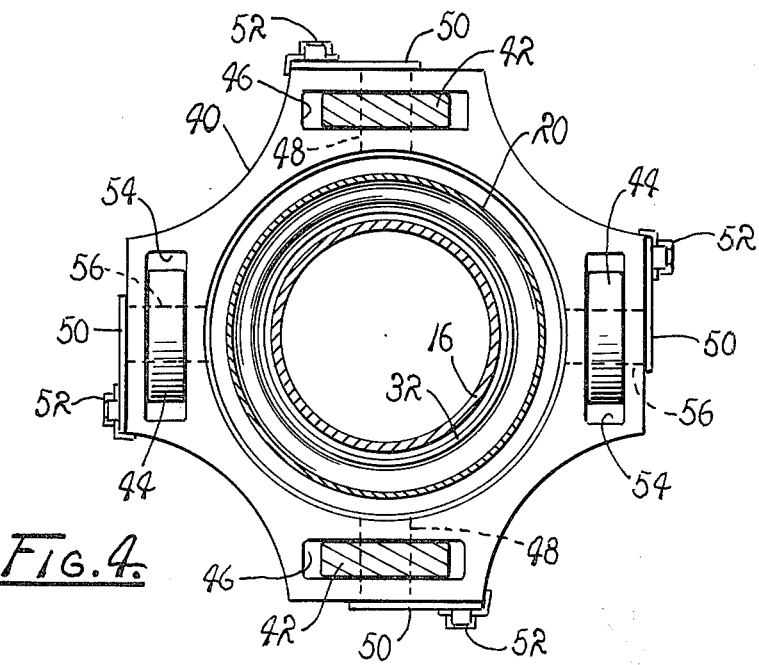
FIG. 4 is a cross-sectional view, taken generally along line 4—4 of FIG. 1.

As illustrated, FIGS. 1 through 3, the duct joint 10 is, in operation, connected between the adjacent ends of a pair of conduits, designated 12 and 14, and serves to conduct therebetween a stream of pressurized fluid. At least one of the conduits 12 and 14 is movable with respect to the other.

The duct joint 10 includes a pair of axially spaced terminal sleeves 16 and 18, having a common diameter $D_1$. Extended between the terminal sleeves 16 and 18, there is a tubular bellows 20 including a pair of similarly dimensioned bellows segments 20a and 20b. The segments 20a and 20b are fabricated of suitable material and include annular convolutions through which flexibility is afforded the bellows 20. The bellows 20 is telescopically related at each of its opposite ends with one of the terminal sleeves and is secured thereto at convolution tangent points, designated $T_1$, through an annular bracket 22 affixed to each of the sleeves 16 and 18. The terminal sleeves 16 and 18 are united with the bellows 20, as by welding or the like to form an hermetic seal therebetween.

Encased within the bellows 20 and extended between the adjacent ends of the terminal sleeves 16 and 18 there is a stabilizing sleeve 24 of a suitable length and having a major diameter $D_2$ equal to the diameter $D_1$. The stabilizing sleeve 24 has therearound a concentric annular support ring 25 integral therewith and connected at convolution tangent points, designated $T_2$, to each of the adjacent ends of the segments 20a and 20b, as by welding and the like. The sleeve 24 is connected to sleeves 16 and 18 through a pair of spherical/cylindrical joints 26 and 28, respectively. Each of the joints 26 and 28 is located in an orthogonally related plane passing through each of the bellows segments 20a and 20b midway between the tangent points $T_1$ and $T_2$. Since the spherical/cylindrical joints 26 and 28 are of similar construction and perform a similar function, a description of the joint 28 is believed adequate to provide a complete understanding of the instant invention.

Figure 5:
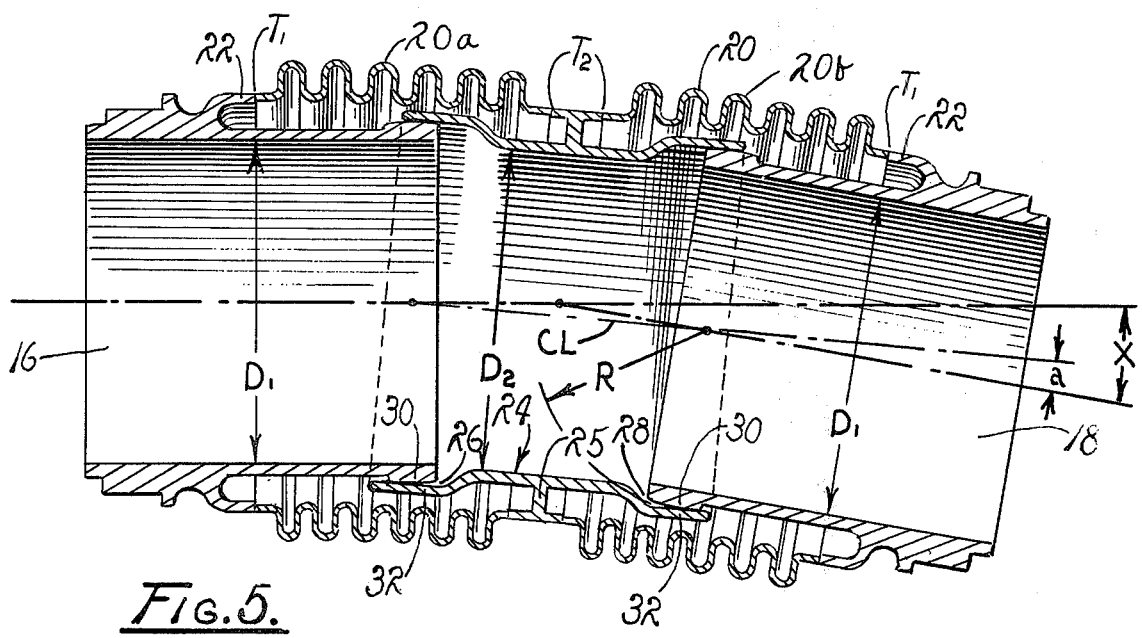
FIG. 5 is a schematic view on somewhat of an enlarged scale, more clearly illustrating one manner in which the duct joint is caused to be deflected.

The joint 28 includes an annular bead 30 disposed in circumscribing relation with the end of the sleeve 18 located in juxtaposition with the stabilizing sleeve 24. The bead 30, in practice, includes an external bearing surface conforming to the configuration of a segment of a sphere having a radius R, upon which there is seated a cylindrical bearing surface provided for a lip 32 projected axially from the stabilizing sleeve 24. As a practical matter, the bearing surface of the lip 32 and the bearing surface of the bead 30 are so mated as to form a substantial seal therebetween. Due to the fact that the inner surface of the lip 32 is of a cylindrical configuration both pivotal and slight axial motion of the terminal sleeve 18 relative to the stabilizing sleeve 24 are accommodated. A deflection of the terminal sleeve 18 in any given direction relative to the longitudinal axis of the stabilizing sleeve 24, designated CL, is through a deflection angle, designated a, FIG. 5, and is through an angular distance equal to one-half the total deflection of the flexible duct joint, in the given direction, designated angle X for the sake of convenience, that is to say, the total angular distance through which one terminal sleeve may be deflected relative to the other sleeve is through an angle twice the angular distance through which the sleeve may be deflected relative to the stabilizing sleeve 24.

The distal ends of the terminal sleeves 16 and 18, in turn, are received by a pair of terminal supports 34 and 36, respectively, journaled to a common gimbal ring 40. The gimbal ring 40 substantially conforms to an annulus and circumscribes the mid-portion of the bellows 20 and is connected with the terminal support 34 through a first pair of journal lugs 42, and to the terminal support 36 through a second pair of lugs, designated 44.

The lugs 42 are integrally related with the annular support 34 and project therefrom in parallelism along opposite sides of the bellows 20 with the distal ends thereof being received within a pair of reliefs, commonly designated 46, formed in the gimbal ring 40. A pair of coaxially related journal pins 48 are extended through suitable openings, not designated, provided in the gimbal ring 40, and through coaxially aligned openings, also not designated, provided in the distal ends of the lugs 42. A pair of suitable retainer caps 50 are fastened to the gimbal ring 40 by a pair of screws 52 seated in screw-threaded bores, not designated, located adjacent to each of the journal pins 48 for securing the journal pins in place relative to the gimbal ring 40 and the lugs 42.

In a similar fashion, the distal ends of the lugs 44 are received within a pair of reliefs 54, also provided in the gimbal ring 40, and are pinned in place by a pair of journal pins 56 extended through suitable openings formed in coaxial alignment in the gimbal ring 40 and the distal ends of the lugs 44. It is important here to note that the journal pins 48 are coaxially aligned in a first plane while the journal pins 56 are coaxially aligned in a second plane normally related to the first plane so that the journal pins 48 and 56 establish a pair of orthogonally related pivotal axes intersecting at the center of the duct joint 10. Consequently, omnidirectional angulation of the duct joint is facilitated.

OPERATION

It is believed that in view of the foregoing description, the operation of the device will readily be understood and it will be briefly reviewed at this point.

With the flexible duct joint 10 assembled in the manner hereinbefore described, it is readied to be employed in coupling adjacent ends of a pair of relatively movable fluid conduits, such as conduits 12 and 14. As angular motion is imparted to one of the conduits 12 and 14, such as conduit 14, relative to conduit 12, pivotal motion of the terminal sleeve 18 is facilitated by journal pins 56. Of course, as the terminal sleeve 18 is thus angularly displaced, the joints 26 and 28 accommodate both pivotal and axial motion between the stabilizing sleeve 24 and the terminal sleeves 16 and 18 and provide pivot centers for each half of the bellows 20.

It will be appreciated that as a stream of fluid under pressure is forced through the duct joint 10, the bellows 20 becomes internally pressurized. However, the bellows is supported against axial extension by the combined effects of the terminal supports 34 and 36 acting through the gimbal ring 40 and against lateral shifting by the effect of the stabilizing sleeve 24. Additionally, the stabilizing sleeve 24 serves to inhibit impingement of the fluid against the external surface of the belows 20.

In view of the foregoing, it should readily be apparent that the flexible duct joint of the instant invention is characterized by a long fatigue life and relatively low-flow loss coefficients and provides a practical solution to the perplexing problem of achieving lateral stability while accommodating both high operating pressures and large deflection angles.

Although the invention has been herein shown and described in what is conceived to be the most practical and preferred embodiment, it is recognized that departures may be made therefrom within the scope of the invention, which is not to be limited to the illustrative details disclosed.

I claim:

1. An externally supported flexible duct joint particularly suited for use in conducting a flow of fluid between a pair of tubular conduits, at least one of said tubular conduits being supported for motion relative to the other, comprising:
   A. a pair of terminal sleeves disposed in substantially axially spaced relation, each of said terminal sleeves being of a tubular configuration and adapted to be coupled in coaxial alignment with an adjacently disposed tubular conduit;
   B. an elongated bellows of a tubular configuration extended between the terminal sleeves of said pair and secured thereto;
   C. a gimbal ring concentrically related to the midspan of said bellows;
   D. a pair of terminal supports each being of an annular configuration and affixed to one of said terminal sleeves in spaced relation with said bellows;
   E. journal means for supporting said terminal supports for oscillation about a pair of orthogonally related axes extended through said gimbal ring including a pair of lugs extended from each of said terminal supports along opposite sides of said bellows, and a pair of journal pins for pivotally connecting the distal ends of each pair of lugs with said gimbal ring;
   F. a bellows stabilizing sleeve disposed within said bellows in concentric relation therewith and a pair of spherical/cylindrical joints interconnecting said stabilizing sleeve with said pair of terminal sleeves; and
   G. means including a support ring mounted on said stabilizing sleeve and connected with said bellows.

2. In an externally supported flexible duct joint of a type adapted to conduct a flow of fluid between a pair of mutually spaced conduits, at least one of which is movable with respect to the other, the improvement comprising:
   a pair of terminal sleeves disposed in an axially spaced relationship, each of said terminal sleeves being of a tubular configuration and adapted to be coupled in coaxial alignment with a selected fluid conduit;
   an elongated bellows of a tubular configuration extended between the terminal sleeves and secured thereto;
   a gimbal ring concentrically related to said bellows;
   journal means for pivotally coupling the pair of terminal sleeves to said gimbal ring;
   means including a bellows stabilizing sleeve disposed within said bellows in concentric relation therewith and connected in substantial coaxial relation with said pair of terminal sleeves for inhibiting impingement of fluid on said bellows; and
   means including a support ring arranged in circumscribing relation with said stabilizing sleeve and affixed thereto and connected with said bellows for supporting the mid-span of said bellows against lateral shifting.

3. The improvement of claim 2 further comprising means including a spherical/cylindrical joint for connecting each of said terminal sleeves to said stabilizing sleeve.

* * * * *